United States Patent
Zhu et al.

(10) Patent No.: US 9,903,704 B2
(45) Date of Patent: Feb. 27, 2018

(54) THREE-DOF HETERODYNE GRATING INTERFEROMETER DISPLACEMENT MEASUREMENT SYSTEM

(71) Applicant: TSINGHUA UNIVERSITY, Beijing (CN)

(72) Inventors: Yu Zhu, Beijing (CN); Leijie Wang, Beijing (CN); Ming Zhang, Beijing (CN); Zhao Liu, Beijing (CN); Rong Cheng, Beijing (CN); Kaiming Yang, Beijing (CN); Dengfeng Xu, Beijing (CN); Weinan Ye, Beijing (CN); Li Zhang, Beijing (CN); Yanpo Zhao, Beijing (CN); Huichao Qin, Beijing (CN); Li Tian, Beijing (CN); Jin Zhang, Beijing (CN); Wensheng Yin, Beijing (CN); Haihua Mu, Beijing (CN); Jinchun Hu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 49 days.

(21) Appl. No.: 14/900,111

(22) PCT Filed: Jun. 5, 2014

(86) PCT No.: PCT/CN2014/079227
§ 371 (c)(1),
(2) Date: Dec. 18, 2015

(87) PCT Pub. No.: WO2014/201951
PCT Pub. Date: Dec. 24, 2014

(65) Prior Publication Data
US 2016/0153764 A1 Jun. 2, 2016

(30) Foreign Application Priority Data
Jun. 19, 2013 (CN) .......................... 2013 1 0243132

(51) Int. Cl.
G01B 9/02 (2006.01)
G01B 11/14 (2006.01)

(52) U.S. Cl.
CPC ..... G01B 9/02007 (2013.01); G01B 9/02003 (2013.01); G01B 9/02021 (2013.01);
(Continued)

(58) Field of Classification Search
CPC ................ G01B 9/02007; G01B 11/14; G01B 9/02003; G01B 9/02021; G01B 9/02027; G01B 9/02022; G01B 2290/70
See application file for complete search history.

(56) References Cited

U.S. PATENT DOCUMENTS

2011/0249270 A1 10/2011 Ishizuka
2015/0268031 A1 9/2015 Zhu et al.

FOREIGN PATENT DOCUMENTS

CN 102937411 A 2/2013
CN 102944176 A 2/2013
(Continued)

OTHER PUBLICATIONS

International Search Report for PCT/CN2014/079227 filed on Jun. 5, 2014.
(Continued)

Primary Examiner — Hwa Lee

(57) ABSTRACT

A three-DOF (Degree of Freedom) heterodyne grating interferometer displacement measurement system comprises a dual-frequency laser, a grating interferometer, a measurement grating, receivers and an electronic signal processing component; the grating interferometer comprises a polarizing beam splitter, a reference grating and dioptric elements; the measurement system realizes displacement measurement on the basis of grating diffraction, the optical Doppler Effect and the optical beat frequency principle. Three linear displacements can be output by the system when the grating
(Continued)

interferometer and the measurement grating perform a three-DOF linear relative motion. The measurement system can reach sub-nanometer and higher resolution and precision, and can simultaneously measure three linear displacements. The measurement system has the advantages of being environmentally insensitive, high in measurement precision, small in size, light in weight, and is capable of improving the overall performances of an ultra-precision stage of a lithography machine as a position measurement system for this stage.

6 Claims, 2 Drawing Sheets

(52) U.S. Cl.
CPC ..... *G01B 9/02022* (2013.01); *G01B 9/02027* (2013.01); *G01B 11/14* (2013.01); *G01B 2290/70* (2013.01)

(56) References Cited

FOREIGN PATENT DOCUMENTS

| | | |
|---|---|---|
| CN | 103309177 A | 9/2013 |
| CN | 103322927 A | 9/2013 |
| EP | 1 762 828 A2 | 3/2007 |

OTHER PUBLICATIONS

Chinese Office Action for Application No. 201310243132.2, dated Apr. 3, 2015.
Chinese Office Action for Application No. 201310243132.2, dated Sep. 16, 2015.

THREE-DOF HETERODYNE GRATING INTERFEROMETER DISPLACEMENT MEASUREMENT SYSTEM

CROSS REFERENCE TO RELATED APPLICATIONS

The present application is a U.S. National Stage of International Patent Application No. PCT/CN2014/079227 filed Jun. 5, 2014, which claims priority to Chinese application number 201310243132.2, filed Jun. 19, 2013, which are incorporated by reference in their entirety.

TECHNICAL FIELD OF THE INVENTION

The present invention relates to a grating measurement system, in particular to a three-DOF (degree of freedom) heterodyne grating interferometer measurement system.

BACKGROUND OF THE INVENTION

The grating measurement system as a typical displacement sensor is widely applied to many mechanical and electrical equipment. The measuring principle of the grating measurement system is mainly based on the principle of Moire fringe and the principle of diffraction and interference. The grating measurement system based on the principle of Moire fringe is a mature displacement sensor having become the first choice of displacement measurement for many mechanical and electrical equipment due to its numerous advantages such as long ranging, low cost, easy alignment, etc., but its accuracy is usually at the micron scale, and it is commonly seen in general industrial applications.

In semiconductor manufacturing equipment, a photoetching machine is the key equipment in the manufacture of semiconductor chips. An ultra-precise workpiece stage is the core subsystem of the photoetching machine, and is used for carrying mask plates and silicon wafers to implement high-speed ultra-precision stepping and scanning movement. The ultra-precise workpiece stage becomes the most typical system in ultra-precise movement systems due to its movement characteristics, such as high-speed, high acceleration, large stroke, ultra-precision, and multi-DOF, etc. In order to achieve the above movements, the ultra-precision workpiece stage usually adopts a dual-frequency laser interferometer measurement system to measure multi-DOF displacements of the ultra-precision workpiece stage. However, as the continuous improvement of such movement indicators as measurement accuracy, measurement distance, measurement speed, etc., the dual-frequency laser interferometer is difficult to meet higher measurement demands due to a series of problems, such as environmental sensitivity, difficulties in improving measurement speed, large space occupation, expensive price, poor in measuring the dynamic characteristics of the target work stage, etc.

With respect to the above-mentioned problems, major companies and research institutions in the field of ultra-precision measurement all around the world launched a series of researches, concentrating mainly on grating measurement system based on the principle of diffraction and interference, and the research results are disclosed in many patents and papers. U.S. Pat. No. 7,102,729 B2 (publication date: Aug. 4, 2005), U.S. Pat. No. 7,483,120 B2 (publication date: Nov. 15, 2007), U.S. Pat. No. 7,940,392 B2 (publication date: Dec. 24, 2009), and Publication No. US2010/0321665 A1 (publication date: Dec. 23, 2010) disclose a plane grating measurement system applied to a ultra-precision workpiece stage of a photoetching machine and its arrangement scheme, where the measurement system mainly uses an one-dimensional or two-dimensional plane grating coordinating with a reading head so as to measure large stroke horizontal displacement of the workpiece stage; and adopts a sensor, such as an eddy current sensor or an interferometer, etc., to measure vertical displacement, but the application of a variety of sensors limits the measurement accuracy of the workpiece stage. U.S. Patent Document Publication No. US2011/0255096 A1 (publication date: Oct. 20, 2011) discloses a grating measurement system applied to a ultra-precision workpiece stage of a photoetching machine, where the measurement system also uses an one-dimensional or two-dimensional grating coordinating with a particular reading head so as to implement displacement measurement and can conduct horizontal and vertical displacement measurements simultaneously, but its structure is complicated. U.S. Patent Document Publication No. US2011/0096334 A1 (publication date: Apr. 28, 2011) discloses a heterodyne interferometer, where the interferometer adopts a grating as the target mirror, but the interferometer can only implement one dimensional measurement. Japanese scholar GAOWEI presents a single-frequency two-dimensional grating measurement system, which utilizes the principle of diffraction and interference, in research paper "Design and construction of a two-degree-of-freedom linear encoder for nanometric measurement of stage position and straightness. Precision Engineering 34(2010)145-155", where the grating measurement system can implement horizontal and vertical displacement measurements simultaneously, but due to the adoption of the single frequency laser light, the measurement signal is susceptible to interference, and accuracy is difficult to be guaranteed. Chinese patent literature Application No. 201210449244.9 (filling date: Nov. 9, 2012) and 201210448734.7 (filling date: Nov. 9, 2012) respectively disclose a heterodyne grating interferometer measurement system, where both the interferometer measurement systems adopt, in their reading head structures, quarter waveplates to change the polarization state of light beam, the optical structure is complex, while the non-ideal properties of the optical element will result in measurement errors.

SUMMARY OF THE INVENTION

In view of the limitations of the above-mentioned technical solution, there is sought a heterodyne grating interferometer measurement system which utilizes the principle of optical beat frequency. The measurement system can implement simultaneous measurements of three-linear-DOF displacements. The measurement system features a short measurement light path, a low environmental sensitivity, an easy-to-process measurement signal, and a resolution and accuracy reaching up to the subnanometer scale or even higher. Meanwhile, the grating interferometer measurement system also features such advantages as a simple structure, a small volume, a light weight, being easy to install, and being convenient to apply, etc. By adopting the measurement system as a displacement measuring device for ultra-precise workpiece stage, it can effectively reduce the disadvantages in the application of the laser interferometer measurement system to the ultra-precise workpiece stage, enhancing the performance of the ultra-precise workpiece stage of a photoetching machine. The three-DOF heterodyne grating interferometer displacement measurement system can also be applied to the precise measurement of multi-DOF displacements of the workpiece stage of precision machine tools, three-coordinate measuring machines, and semiconductor testing equipments, etc.

The technical solution of the present invention is as follows:

A three-DOF heterodyne grating interferometer displacement measurement system, characterized in that it comprises a dual-frequency laser, a grating interferometer, a measurement grating, four receivers and an electronic signal processing component; wherein the grating interferometer comprises a polarizing beam splitter, a reference grating, a first dioptric element and a second dioptric element; each of the reference grating and the measurement grating adopts a two-dimensional reflection grating;

the dual-frequency laser emits dual-frequency orthogonal polarized laser light which is split into transmitted light and reflected light after being incident onto the polarizing beam splitter through optical fiber coupling, wherein the transmitted light is reference light, and the reflected light is measurement light;

after the reference light is incident onto the reference grating, four beams of diffracted and reflected reference light are generated, and the four beams of diffracted and reflected reference light are deflected through the first dioptric element to form four beams of parallel reference light, which return to the polarizing beam splitter and transmit therethrough;

after the measurement light is incident onto the measurement grating, four beams of diffracted and reflected measurement light are generated, and the four beams of diffracted and reflected measurement light are deflected through the second dioptric element to form four beams of parallel measurement light, which return to the polarizing beam splitter and are reflected by the polarizing beam splitter;

four beams of transmitted reference light and four beams of reflected measurement light are incorporated with each other respectively to form four paths of measurement optical signals, respectively, the four paths of measurement optical signals are transmitted to the four receivers through optical fibers to be processed so as to form four paths of measurement electrical signals, respectively, and the four paths of measurement electrical signals are transmitted to the electronic signal processing component to be processed; and meantime, the dual-frequency laser also outputs a beam of reference electrical signal to the electronic signal processing component; when the measurement grating conducts three-DOF linear movements, i.e., movements in x direction, y direction and z direction, with respect to the grating interferometer, the electronic signal processing component outputs three-DOF linear displacements.

In the above technical solution of the present invention, each of the first dioptric element and the second dioptric element adopts a dioptric prism composed of two right angle prisms located on the xoy plane and two right angle prisms located on the xoz plane.

Each of the first dioptric element and the second dioptric element described in the present invention adopts a lens.

A preferred technical solution of the present invention is that: the receivers and the electronic signal processing component are integrated into an integral structure, wherein, the four paths of measurement optical signals and a path of reference electrical signal output from the dual-frequency laser are input to the integral structure to be processed, and then the displacements of the three-DOF linear movements, i.e., movements in x direction, y direction and z direction, are output.

The three-DOF heterodyne grating interferometer displacement measurement system provided by the present invention features the following advantages and prominent effects.

The measurement system can implement simultaneous measurements of three-DOF linear displacements. The measurement system features a short measurement light path, a low environmental sensitivity, an easy-to-process measurement signal, and a resolution and accuracy reaching up to the subnanometer scale or even higher. Meanwhile, the grating interferometer measurement system also features such advantages as a simple structure, a small volume, a light weight, being easy to install, and being convenient to apply, etc. Compared to a laser interferometer measurement system, by applying the measurement system of the present invention to the displacement measurement of the ultra-precise workpiece stage of a photoetching machine can, based on meeting measurement demands, effectively reduce the volume and weight of the workpiece stage, greatly enhance dynamic performance of the workpiece stage, and make the whole performance of the workpiece stage be enhanced comprehensively. The three-DOF heterodyne grating interferometer displacement measurement system can also be applied to the precise measurement of multi-DOF displacements of the workpiece stage of precision machine tools, three-coordinate measuring machines, and semiconductor testing equipments, etc.

Figure 1:
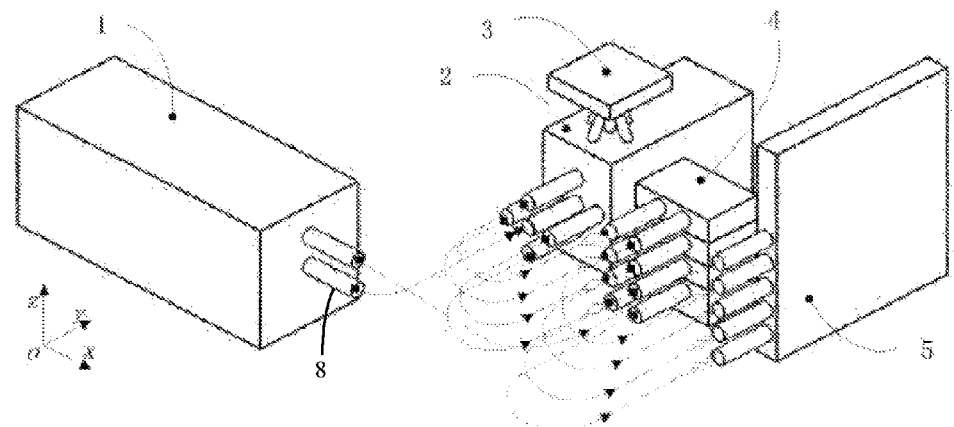
FIG. 1 is a schematic diagram of the first kind of heterodyne grating interferometer displacement measurement system of the present invention.

The reference numbers in the drawings comprise: 1—dual-frequency laser, 2—grating interferometer, 3—measurement grating, 4—receiver, 5—electronic signal processing component, 6—integral structure, 21—polarizing beam splitter, 22—reference grating, 23—dioptric prism, 24—lens.

DETAILED DESCRIPTION OF EMBODIMENTS OF THE INVENTION

Hereinafter, the structure, principle and specific implementing mode of the present invention will be further detailed in connection with the accompanying drawings.

With reference to FIG. 1, FIG. 1 is a schematic diagram of the first kind of heterodyne grating interferometer displacement measurement system of the present invention. As shown in FIG. 1, the three-DOF heterodyne grating interferometer displacement measurement system comprises a dual-frequency laser 1, a grating interferometer 2, a measurement grating 3, receivers 4 and an electronic signal processing component 5, and the measurement grating 3 is a two-dimensional reflection grating.

Figure 3:
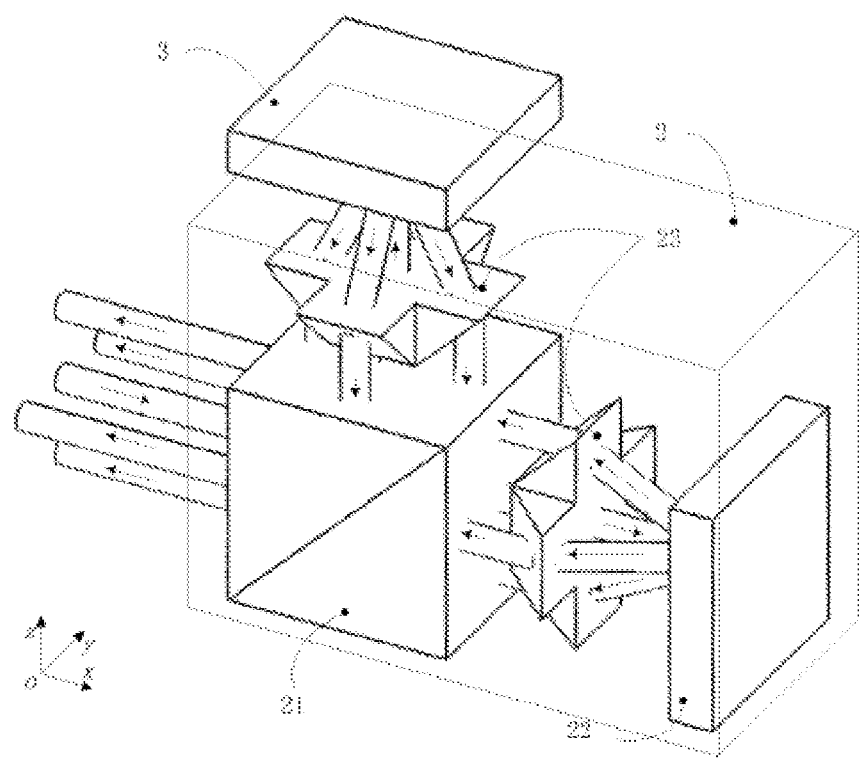
FIG. 3 is a schematic diagram of the internal structure of the first kind of grating interferometer of the present invention of the present invention.

With reference to FIG. 3, FIG. 3 is a schematic diagram of the internal structure of the first kind of grating interferometer of the present invention. The grating interferometer 2 comprises a polarizing beam splitter 21, a reference grating 22, a first dioptric element and a second dioptric element; the reference grating 22 is a two-dimensional reflection grating; and, each of the first dioptric element and the second dioptric element adopts a dioptric prism 23 composed of two right angle prisms located on the xoy plane and two right angle prisms located on the xoz plane.

The principle of the measurement system will be described in conjunction with FIG. 1 and FIG. 3. The dual-frequency laser 1 emits dual-frequency orthogonal polarized laser light which is split into transmitted light and reflected light after being incident onto the polarizing beam splitter 21 through an optical fiber coupling 8, wherein the transmitted light is reference light, and the reflected light is measurement light; after the reference light is incident onto the reference grating 22, four beams of diffracted and reflected reference light are generated, and the four beams of diffracted and reflected reference light are deflected through the dioptric prism 23 to form four beams of parallel reference light, which return to the polarizing beam splitter 21 and transmit therethrough; after the measurement light is incident onto the measurement grating 3, four beams of diffracted and reflected measurement light are generated, the four beams of diffracted and reflected measurement light are deflected through the dioptric prism 23 to form four beams of parallel measurement light, which return to the polarizing beam splitter 21 and are reflected by the polarizing beam splitter 21; the four beams of transmitted reference light and the four beams of reflected measurement light are incorporated with each other respectively to form four paths of measurement optical signals, which are transmitted to the four receivers 4, respectively, through optical fibers to be processed so as to form four paths of measurement electrical signals, respectively, and the four paths of measurement electrical signals are transmitted to the electronic signal processing component 5 to be processed; meantime, the dual-frequency laser 1 also outputs a beam of reference electrical signal to the electronic signal processing component 5; when the measurement grating 3 conducts three-DOF linear movements, i.e., movements in x direction, y direction and z direction (the movement in z direction is a minute movement, where the movement range is about 1 mm), with respect to the grating interferometer 2, the electronic signal processing component 5 outputs three-DOF linear displacements.

The expressions of the displacements of the three-DOF movements are: $x=k_x \times (\alpha-\beta)$, $y=k_y \times (\gamma-\delta)$, $z=k_z \times (\alpha+\beta+\gamma+\delta)$, $k_x=\Lambda_x/4\pi$, $k_y=\Lambda_y/4\pi$ and $k_z=\lambda/4(1+\cos\theta)$, where $\alpha$, $\beta$, $\gamma$ and $\delta$ are the reading values of an electronic signal processing card, $\Lambda_x$ and $\Lambda_y$ are the grating constants, $\lambda$ is the wavelength of the laser light, $\theta$ is the grating diffraction angle, taking $\Lambda_x=\Lambda_y=1$ μm, $\lambda=632.8$ nm, the phase resolution of $\alpha$, $\beta$, $\gamma$ and $\delta$ is $2\pi/1024$, the measurement resolution of x, y and z of the heterodyne grating interferometer are 0.49 nm, 0.49 nm and 0.18 nm, respectively.

Figure 2:
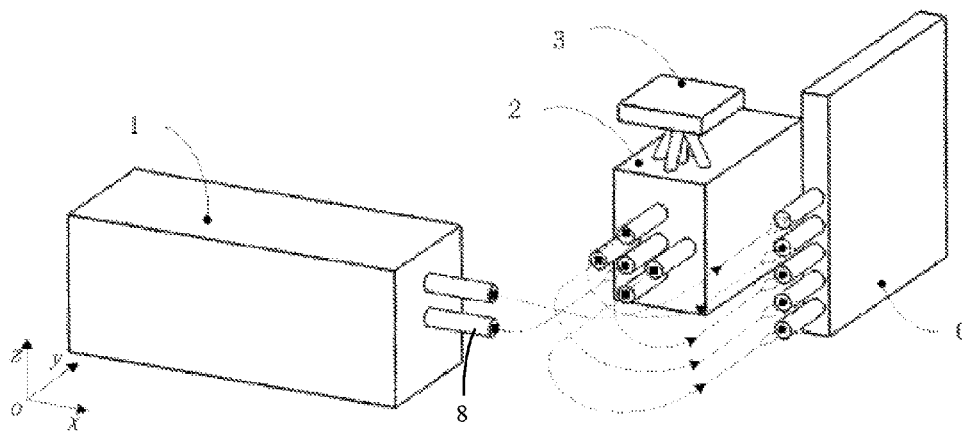
FIG. 2 is a schematic diagram of a second kind of heterodyne grating interferometer displacement measurement system of the present invention.

With reference to FIG. 2, FIG. 2 is a schematic diagram of the second kind of heterodyne grating interferometer displacement measurement system of the present invention. As shown in FIG. 2, the receivers 4 and the electronic signal processing component 5 are integrated into an integral structure 6, wherein, the four paths of measurement optical signals and a path of reference electrical signal output from the dual-frequency laser are input to the integral structure 6 to be processed, and then the displacements of the three-DOF linear movements, i.e., movements in x direction, y direction and z direction, are output. The adoption of this kind of integral structure 6 of the measurement system can effectively reduce the number of systematic components, improve anti-jamming capability of the system, and improve system integration.

Figure 4:
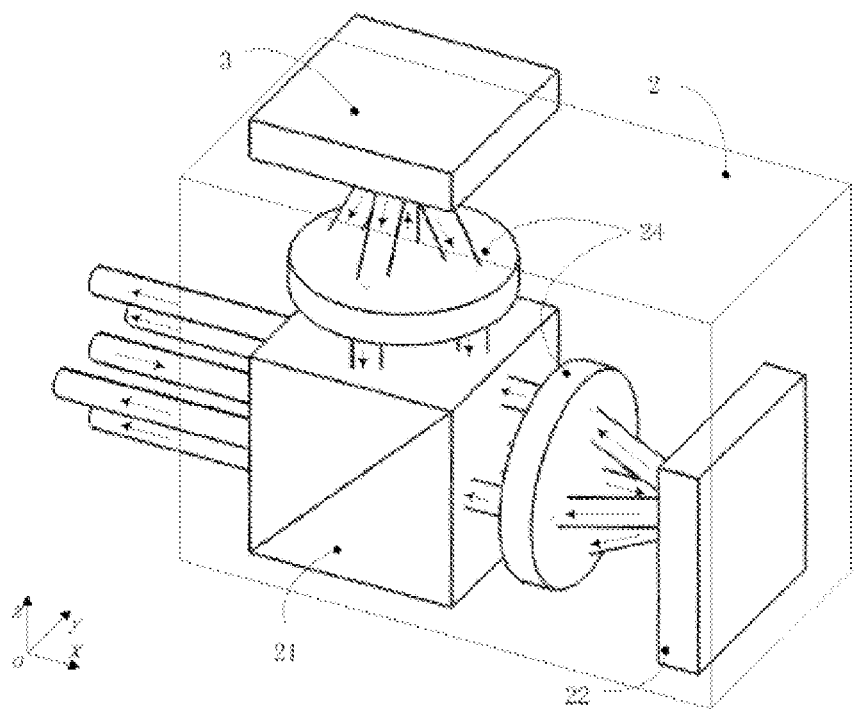
FIG. 4 is a schematic diagram of the internal structure of the second kind of grating interferometer of the present invention.

With reference to FIG. 4, FIG. 4 is a schematic diagram of the internal structure of the second kind of grating interferometer of the present invention. In the internal structure of the grating interferometer, as shown in FIG. 4, each of the first dioptric element and the second dioptric element adopts lens 24. Compared to the dioptric prism 23, the lens 24 features such advantages as simple structure, being easy to process and being convenient to install.

The measurement system and structure scheme described in the above embodiments can implement simultaneous measurements of three-linear-DOF displacements, and the measurement system features a short measurement light path, a low environmental sensitivity, an easy-to-process measurement signal, and a resolution and accuracy reaching up to the subnanometer scale or even higher. Meanwhile, the grating interferometer measurement system also features such advantages as a simple structure, a small volume, a light weight, being easy to install, and being convenient to apply, etc. Compared to a laser interferometer measurement system, the measurement system of the present invention applied to the displacement measurement of the ultra-precise workpiece stage of a photoetching machine can, based on meeting measurement demands, effectively reduce the volume and weight of the workpiece stage, greatly enhance dynamic performance of the workpiece stage, and make the whole performance of the workpiece stage be enhanced comprehensively. The three-DOF heterodyne grating interferometer displacement measurement system can also be applied to the precise measurement of multi-DOF displacements of the workpiece stage of precision machine tools, three-coordinate measuring machines, and semiconductor testing equipment, etc.

The invention claimed is:
1. A three-DOF (Degrees Of Freedom) heterodyne grating interferometer displacement measurement system, characterized in that it comprises:
   a dual-frequency laser (1),
   a grating interferometer (2),
   a measurement grating (3),
   four receivers (4) and
   an electronic signal processing component (5),
   wherein the grating interferometer (2) comprises:
      a polarizing beam splitter (21),
      a reference grating (22),
      a first dioptric element, and
      a second dioptric element;
   wherein each of the reference grating (22) and the measurement grating (3) adopts a two-dimensional reflection grating;
   the dual-frequency laser (1) emits a dual-frequency orthogonal polarized laser light which is split into a transmitted light and a reflected light after being provided to the polarizing beam splitter (21) through an optical fiber coupling, wherein the transmitted light is a reference light, and the reflected light is a measurement light;
   after the reference light is incident onto the reference grating (22), four beams of diffracted and reflected reference light are generated, and the four beams of diffracted and reflected reference light are deflected through the first dioptric element to form four beams of parallel reference light, which return to the polarizing beam splitter (21) and transmit therethrough;

after the measurement light is incident onto the measurement grating (3), four beams of diffracted and reflected measurement light are generated, and the four beams of diffracted and reflected measurement light are deflected through the second dioptric element to form four beams of parallel measurement light, which return to the polarizing beam splitter (21) and are reflected by the polarizing beam splitter (21);

four beams of transmitted reference light and four beams of reflected measurement light are incorporated with each other respectively to form four paths of measurement optical signals; the four paths of measurement optical signals are transmitted to the four receivers (4) through optical fibers to be processed so as to form four paths of measurement electrical signals, respectively, and the four paths of measurement electrical signals are transmitted to the electronic signal processing component (5) to be processed;

meantime, the dual-frequency laser (1) also outputs a beam of reference electrical signal to the electronic signal processing component (5); when the measurement grating (3) conducts three-DOF linear movements, i.e., movements in x direction, y direction and z direction, with respect to the grating interferometer (2), the electronic signal processing component (5) outputs three-DOF linear displacements, and the displacements of the three-DOF movements are calculated by $k_x = \Lambda_x/4\pi$, $k_y = \Lambda_y/4\pi$, $k_z = \lambda/4(1+\cos\theta)$, $x = k_x \times (\alpha-\beta)$, $y = k_y \times (\gamma-\delta)$, and $z = k_z \times (\alpha+\beta+\gamma+\delta)$, where $\alpha$, $\beta$, $\gamma$ and $\delta$ are the reading values of an electronic signal processing component (5), $\Lambda_x$ and $\Lambda_y$ are grating constants in the x and y directions of the measurement grating (3) and the reference grating (22), $\lambda$ is the wavelength of the laser light, and $\theta$ is a grating diffraction angle of the measurement grating (3) and the reference grating (22).

2. The three-DOF heterodyne grating interferometer displacement measurement system according to claim 1, characterized in that each of the first dioptric element and the second dioptric element adopts a dioptric prism (23) composed of two right angle prisms located on xoy plane and two right angle prisms located on xoz plane.

3. The three-DOF heterodyne grating interferometer displacement measurement system according to claim 1, characterized in that each of the first dioptric element and the second dioptric element adopts a lens (24).

4. The three-DOF heterodyne grating interferometer displacement measurement system according to claim 1, characterized in that the receivers (4) and the electronic signal processing component (5) are integrated into an integral structure (6), wherein, the four paths of measurement optical signals and a path of reference electrical signal output from the dual-frequency laser are input to the integral structure (6) to be processed, and then the displacements of the three-DOF linear movements, i.e., movements in x direction, y direction and z direction, are output.

5. The three-DOF heterodyne grating interferometer displacement measurement system according to claim 2, characterized in that the receivers (4) and the electronic signal processing component (5) are integrated into an integral structure (6), wherein, the four paths of measurement optical signals and a path of reference electrical signal output from the dual-frequency laser are input to the integral structure (6) to be processed, and then the displacements of the three-DOF linear movements, i.e., movements in x direction, y direction and z direction, are output.

6. The three-DOF heterodyne grating interferometer displacement measurement system according to claim 3, characterized in that the receivers (4) and the electronic signal processing component (5) are integrated into an integral structure (6), wherein, the four paths of measurement optical signals and a path of reference electrical signal output from the dual-frequency laser are input to the integral structure (6) to be processed, and then the displacements of the three-DOF linear movements, i.e., movements in x direction, y direction and z direction, are output.

* * * * *